United States Patent
Irschara et al.

(10) Patent No.: US 9,430,822 B2
(45) Date of Patent: Aug. 30, 2016

(54) MOBILE IMAGING PLATFORM CALIBRATION

(71) Applicant: Microsoft Technology Licensing, LLC, Redmond, WA (US)

(72) Inventors: Arnold Irschara, Graz (AT); Gerald Schweighofer, GrossSteinbach (AT); Konrad Karner, Raaba (AT); Richard Ladstädter, Graz (AT); Martin Ponticelli, Graz (AT)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 488 days.

(21) Appl. No.: 13/917,783

(22) Filed: Jun. 14, 2013

(65) Prior Publication Data

US 2014/0368651 A1   Dec. 18, 2014

(51) Int. Cl.
*H04N 7/18* (2006.01)
*G06T 7/00* (2006.01)
(Continued)

(52) U.S. Cl.
CPC .............. *G06T 7/00* (2013.01); *G01S 7/4972* (2013.01); *G01S 17/023* (2013.01); *G01S 17/42* (2013.01); *G06T 3/00* (2013.01); *G06T 7/002* (2013.01); *G06T 7/0018* (2013.01)

(58) Field of Classification Search
CPC .............. B60R 1/00; B60R 2300/105; B60R 2300/802; B60R 11/04; H04N 7/181
USPC ........................................................ 348/148
See application file for complete search history.

(56) References Cited

U.S. PATENT DOCUMENTS

| | | | |
|---|---|---|---|
| 6,759,979 B2 * | 7/2004 | Vashisth | G01C 11/02 342/357.31 |
| 8,138,938 B2 | 3/2012 | Troy | |

(Continued)

FOREIGN PATENT DOCUMENTS

| | | |
|---|---|---|
| WO | 2006027339 A2 | 3/2006 |
| WO | 2009118043 A1 | 10/2009 |
| WO | 2012134419 A1 | 10/2012 |

OTHER PUBLICATIONS

"International Preliminary Report on Patentability Issued in PCT Patent Application No. PCT/US2014/042021", Mailed Date: Jun. 25, 2015, 7 Pages.

(Continued)

*Primary Examiner* — Jamie Atala
*Assistant Examiner* — On S Mung
(74) *Attorney, Agent, or Firm* — Steven Spellman; Tom Wong; Micky Minhas (57) ABSTRACT

Mobile platforms are used to capture an area using a variety of sensors (e.g., cameras and laser scanners) while traveling through the area, in order to create a representation (e.g., a navigable set of panoramic images, or a three-dimensional reconstruction). However, such sensors are often precisely calibrated in a controlled setting, and miscalibration during travel (e.g., due to a physical jolt) may result in a corruption of data and/or a recalibration that leaves the platform out of service for an extended duration. Presented herein are techniques for verifying sensor calibration during travel. Such techniques involve the identification of a sensor path for each sensor over time (e.g., a laser scanner path, a camera path, and a location sensor path) and a comparison of the paths, optionally after registration with a static coordinate system, to verify that the continued calibration of the sensors during the mobile operation of the platform.

20 Claims, 9 Drawing Sheets

(51) Int. Cl.
   *G01S 17/02* (2006.01)
   *G06T 3/00* (2006.01)
   *G01S 17/42* (2006.01)
   *G01S 7/497* (2006.01)

(56) References Cited

U.S. PATENT DOCUMENTS

| | | | |
|---|---|---|---|
| 8,374,817 B2 | 2/2013 | Boeve | |
| 2003/0137449 A1 | 7/2003 | Vashisth et al. | |
| 2006/0007308 A1 | 1/2006 | Ide | |
| 2006/0182314 A1* | 8/2006 | England | G01C 15/002 382/106 |
| 2012/0173185 A1 | 7/2012 | Taylor | |

OTHER PUBLICATIONS

"International Search Report & Written Opinion Received for PCT Patent Application No. PCT/US2014/042021", Mailed Date: Jan. 22, 2015, 18 Pages.

Irschara, et al., "Efficient Structure from Motion with Weak Position and Orientation Priors"—Published Date: Jun. 20, 2011, Proceedings: In IEEE Computer Society Conference on Computer Vision and Pattern Recognition Workshops, pp. 8, http://aerial.icg.tugraz.at/papers/wavp2011_gps.pdf.

Kremer, et al., "Performance of the StreetMapper Mobile LIDAR Mapping System in "Real World" Projects"—Retrieved Date: Mar. 5, 2013, Proceedings: In Photogrammetric Week, vol. 7, pp. 11, http://www.ifp.uni-stuttgart.de/publications/phowo07/240Kremer.pdf.

Bileschi, Stanley, "Fully Automatic Calibration of LIDAR and Video Streams from a Vehicle"—Published Date: May 2010, Proceedings: In IEEE 12th International Conference on Computer Vision Workshops, pp. 9, http://www.google.co.in/url?sa=t&rct=j&q=&esrc=s&source=web&cd=1&cad=rja&ved=0CDAQFjAA&url=http%3A%2F%2Fdspace.mit.edu%2Fopenaccess-disseminate%2F1721.1%2F58909&ei=xY41UeTQCaqziQesioGICg&usg=AFQjCNFhB_LGkUwizW1qZSp8NCntArulqA&sig2=2I2XB1prEpGek-i0H0HE0w&bvm=bv.43148975,d.bmk.

Liu, et al., "Feasibility Study for Automatic Calibration of Transportation Simulation Models"—Published Date: Apr. 4, 2011, Proceedings: In Proceedings of the 44th Annual Simulation Symposium, pp. 10, http://www.geo.umass.edu/faculty/yu/SpringSim11ANSS-AutoCalibration.pdf.

* cited by examiner

MOBILE IMAGING PLATFORM CALIBRATION

BACKGROUND

Within the field of computing, many scenarios involve a scanning of a mobile platform provided to travel through an area and capture a representation of the area. For example, an automobile equipped with one or more cameras may be driven through a road network of a city while capturing images of the city, which are later stitched together to form a navigable pictorial tour of the city. As another example, a scan of the area using laser scanners of various types, such as light detection and ranging ("lidar") scanners, may result in the capturing of spatial information about the area that enables a three-dimensional reconstruction of the geometry of the area. These and other techniques may be utilized to capture and reconstruct various types of representations of an area.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

With many mobile platforms, the scanning devices aboard the platform are precisely calibrated in a controlled setting before entering an area for scanning. Such calibration may be performed, e.g., in order to verify that the images of the area are captured by cameras and/or lidar devices with a precisely calibrated orientation, such that reconstruction of the captured area (such as stitching together images captured by images with different orientations) may produce accurate results. However, the precise calibration achieved in a controlled setting may be difficult to maintain for extended periods of travel. If a physical jolt causes a sensor device to become significantly misaligned, the mobile platform may have to return to the controlled setting. Such recalibration may leave the platform out of service for an extended duration, and may be expensive to perform with acceptable precision. Additionally, failure to detect a miscalibration may result in extensive capturing of data that results in errors (e.g., misaligned stitching of panoramic images or three-dimensional reconstruction, resulting in significant errors and data corruption) and/or the discarding of an extensive data set that is unusable for reconstruction.

Presented herein are techniques for verifying the calibration of the sensors of a mobile platform during traveling. In accordance with these techniques, a mobile platform comprising at least one laser scanner, at least one camera, and a location sensor (e.g., a global positioning system (GPS) receiver, an inertial measurement unit (IMU), and/or a radio triangulation device) may travel through an area while capturing data with each sensor over time (e.g., capturing images with the cameras; capturing a laser scan of the area with the laser scanners; and capturing the location of the platform with the location sensor). For each sensor, a sensor path may be identified, comprising a detected path of the sensor while the platform moves through the area. As a first example, the laser scanner may generate a laser scanner path by comparing the laser scans captured at successive periods of time (e.g., a first lidar point cloud indicating the distance of the platform from a fixed object, such as a building, at a first time, and a second lidar point cloud indicating the distance of the platform from the same object at a second time), and may determine the laser scanner path, comprising a sequence of translations and orientations of the platform over time. The images captured at various intervals may be compared (e.g., a fixed tie point may be identified in different locations in two consecutive images, and image evaluation techniques may be utilized to determine the perspective points within the area where each image was captured), resulting in a determination of the camera path as a sequence of translations and orientation changes over a period of time. Similarly, the locations detected by the location sensor may be detected to identify a location sensor path of the location sensor over time.

Upon identifying the laser scanner path, the camera path, and the location sensor path, the platform may compare these paths to verify the maintenance of the calibration of the sensors. In an embodiment, the coordinate system of each sensor is registered with a static coordinate system, and the translation and orientation changes between each pair of points in a first sensor path of a first sensor of the platform may be compared with the corresponding translations and orientation changes between each pair of points in a second sensor path of another sensor of the platform. Matching comparisons may verify the continued calibration of the sensors, while mismatches (e.g., discrepancies in the detected translation and orientation change of the platform over time) may indicate that at least one sensor has become miscalibrated. Additionally, a three-way comparison of the laser scanner path with the camera path, the laser scanner path with the location sensor path, and the camera path with the location sensor path (as well as comparisons among paths of equivalent sensors, e.g., comparing a first camera path detected by a first camera and a second camera path detected by a second camera) may identify the miscalibrated device. By performing such calibration checking using the computation and comparison of paths for each device, the techniques presented herein may enable periodic and/or continuous verification of maintained calibration even while the platform continues to travel, and/or a faster and more accurate technique for detecting a miscalibration, which may reduce inefficiencies caused by the miscalibration. These and other uses of such calibration techniques may be included in many embodiments of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Figure 1:
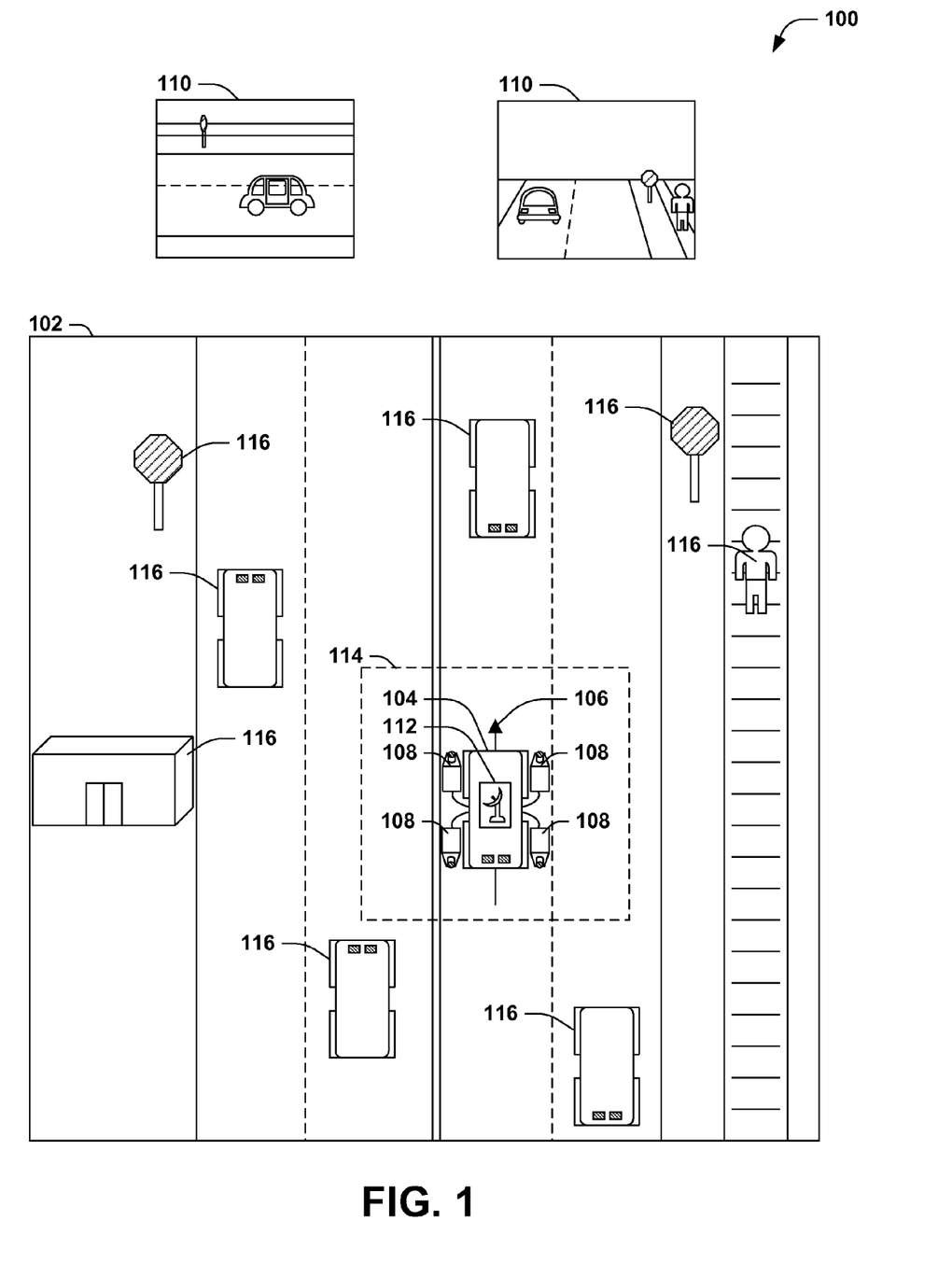
FIG. 1 is an illustration of an exemplary scenario featuring a vehicle moving within an area while capturing images of the area while monitoring a location of the vehicle with a location sensor.

FIG. 1 presents an illustration of a first exemplary scenario 100 featuring a platform 104 traveling through an area 102 while capturing a representation of the area 102 using a variety of sensors. While the platform 104 is mobile (e.g., exhibiting a particular motion vector 106 with respect to the stationary objects of the area 102), the mobile platform may use one or more cameras 108, positioned at different orientations with respect to the platform 104 (e.g., a front-facing camera 108, a left-facing camera 108, a right-facing camera 108, a rear-facing camera 108, and one or more upward-facing cameras 108) that periodically capture images 100 of the area 102. The platform 104 may also comprise a location sensor 112 that is configured to detect a location 114 of the platform 104, such as a global positioning system (GPS) receiver, an inertial measurement unit (IMU), and/or a radio triangulation device (e.g., a cellular communications device configured to triangulate the location 114 of the platform 104 based on the signal strength of nearby cellular towers at fixed and known locations, and transmitting at a detectable transmission power). The images 110 capture of the area 102, optionally including various objects 116 within the area 102 (e.g., other vehicles, buildings, pedestrians, and road signs), may enable a reconstruction of the area 102, such as a navigable set of panoramic images 110.

Figure 2:
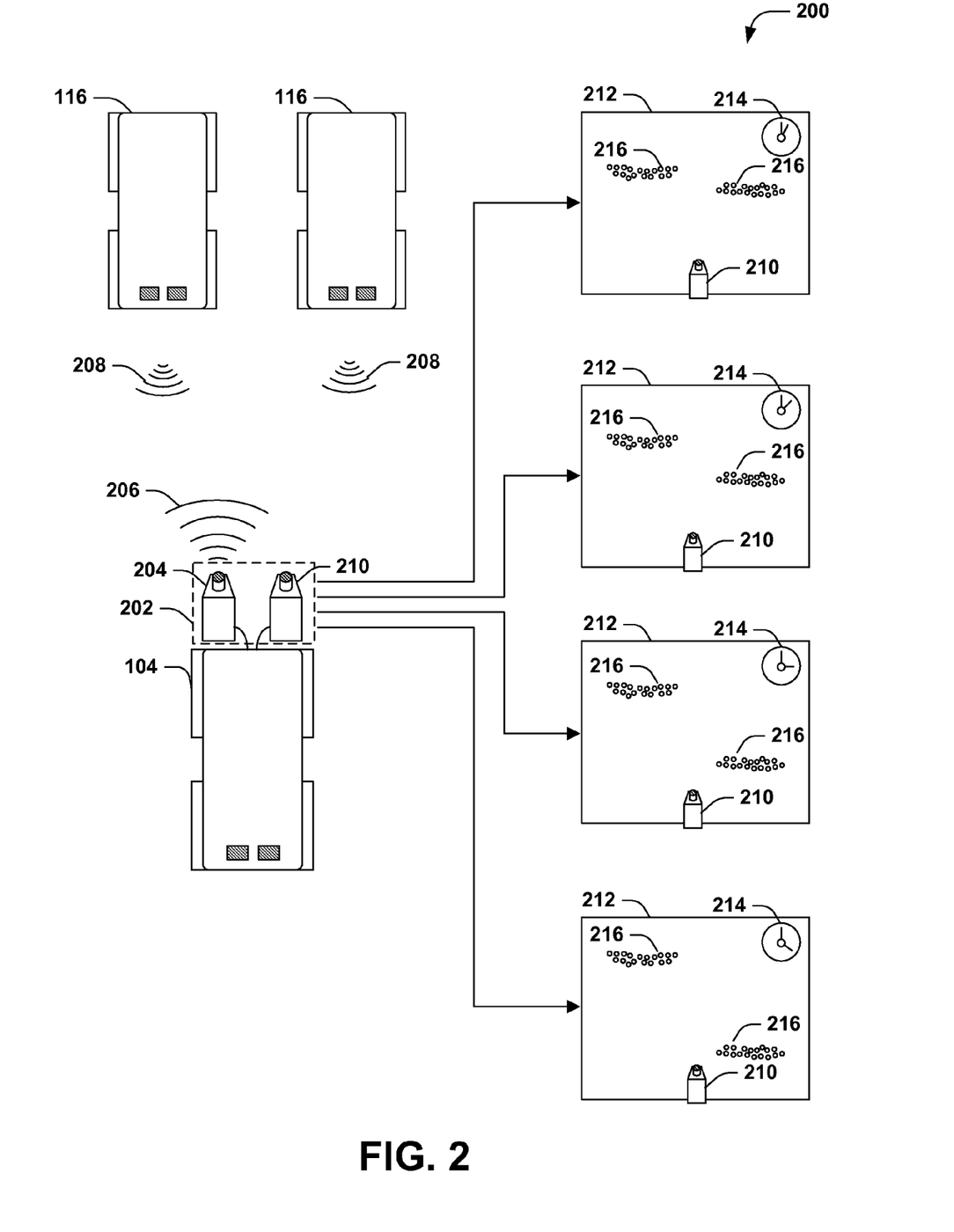
FIG. 2 is an illustration of an exemplary scenario featuring a capturing of a lidar point cloud of an area around a vehicle and depicting the other objects present within the area.

FIG. 2 presents an illustration of a second exemplary scenario 200 featuring a platform 104 traveling through an area 102 while capturing a different representation of the area 102. In this exemplary scenario 200, the platform 104 features a laser scanner 202, comprising a lidar emitter 204 configured to transmit a laser signal 206, and a lidar detector 210 configured to detect reflections 208 of the lidar signal 206 from nearby objects 116 within the area 102. By detecting the reflections 208 at respective times 214, the laser detector may extrapolate, from the lidar data 212 captured at that time 214, one or more lidar point clouds 216 respectively indicating the reflection of the lidar signal 206 from an object 116. Further evaluation of the lidar point cloud 216 may enable the determination of the shapes, sizes, orientations, and distances of the objects 116. This information may later be used, e.g., to generate a three-dimensional reconstruction of the area 102 (including the objects 116 present in the area 102) at the time of the capturing.

A platform 104 may combine the capturing of images 110 using one or more cameras 108 and the capturing of lidar data 212 and lidar point clouds 216 to generate a robust representation of the area 102. Additionally, the platform 104 may utilize the location sensors 112 to detect the path of the platform 104 over time, which may inform the reconstruction process.

However, the accurate representation of an area 102 based on the capturing of various types of data using a variety of sensors mounted on the mobile platform 104 may be diminished by miscalibration. For example, the reconstruction of data from multiple sensors may significantly depend on presumptions of the position and/or orientation of the sensor with respect to the platform 104 and other sensors. A miscalibration of one or more sensors may arise, e.g., due to a physical jolt of the sensor and/or mobile platform 104. Reconstructing the area 102 with a variance between the presumed orientation and the actual orientation of the sensor may result in visual artifacts, distortions, and other forms of corruption. As a first example, if one or more cameras 108 of a camera set is miscalibrated, the images 110 automatically stitched together from the cameras 108 may exhibit gaps, spherical aberration, missing areas, or jarring transitions between image borders. As a second example, if one or more laser scanners 202 is miscalibrated, the geometry of the reconstruction of the area 102 may be distorted in size, shape, or relationships between detected surfaces of objects 116. As a third example, if the location sensor 112 is miscalibrated, then the reconstruction may indicate inaccurate locations for the depictions of images 110 and/or three-dimensional object reconstruction, and/or mismatch among images 110 and/or three-dimensional object reconstructions if the calibration of the location sensor 112 changes over time.

In order to avoid these problems, mobile platforms 104 are often calibrated in a controlled setting with high precision. For example, the respective sensors may be carefully mounted on the platform 104, carefully oriented to a high degree of precision, and affixed in the orientation through strong mechanical brackets. However, the calibration process may be expensive and protracted, and a sensor that is subjected to a physical jolt while the platform 104 is traveling may result in a recall of the platform 104 to the controlled setting for recalibration, possibly entailing a high cost of recalibration, and/or leaving the platform 104 out of service for a potentially extended duration. Alternatively, if the physical jolt is not detected, the platform 104 may capture a large set of data that is later determined to be corrupted and/or misaligned, or, if undetected, may corrupt the automated reconstruction of the area 102 based on the captured data.

B. Presented Techniques

Figure 3:
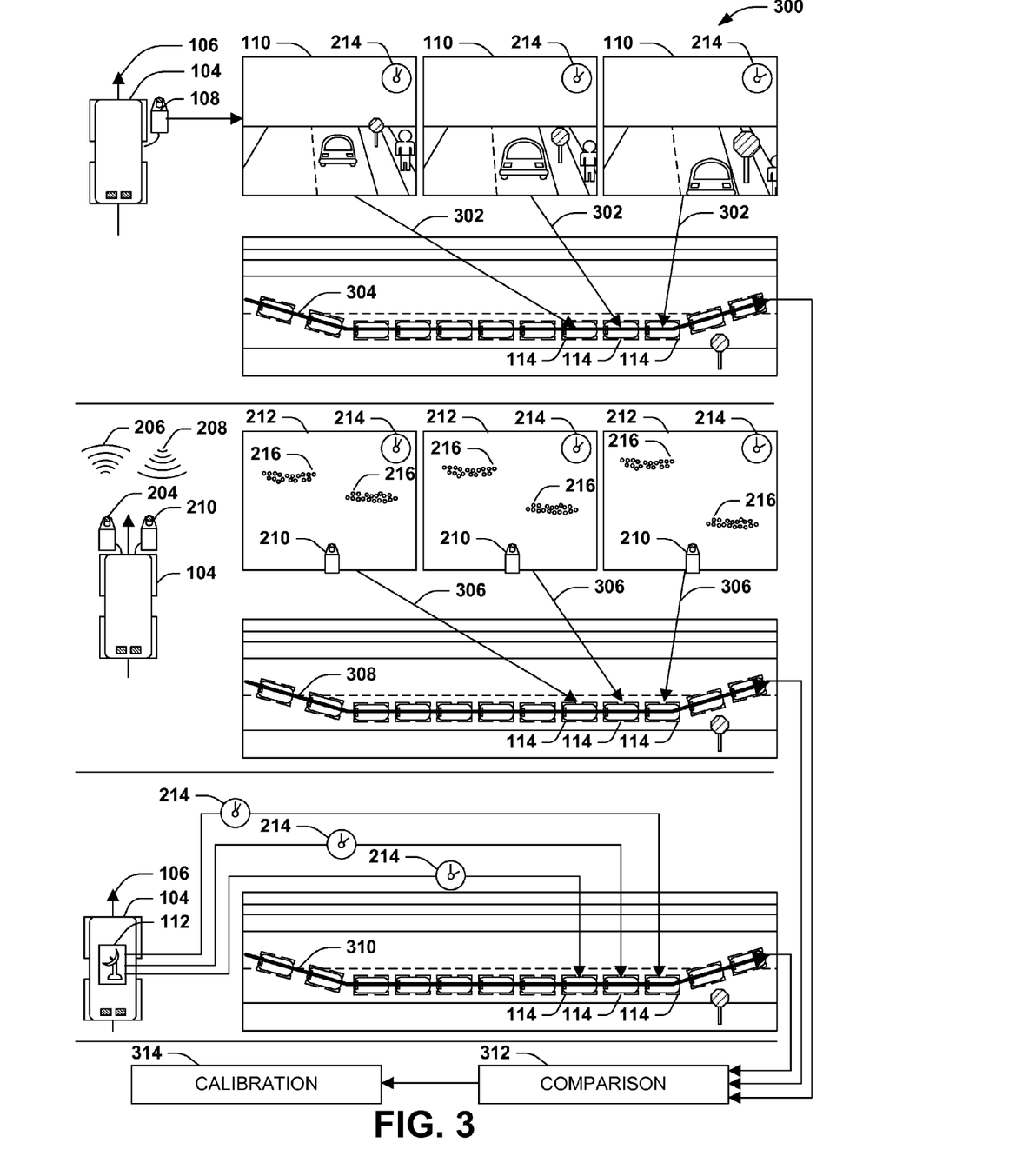
FIG. 3 is an illustration of an exemplary scenario featuring a comparison of sensor paths in order to verify the calibration of the sensors of the platform in accordance with the techniques presented herein.

FIG. 3 presents an illustration of an exemplary scenario 300 depicting techniques for verifying the sensor calibration of a platform 104 while traveling through an area 102. In this exemplary scenario, for the respective sensors of the platform 104, a sensor path may be identified representing the travel of the platform 104 through the area 102, based on the data available to that sensor.

As a first example, for respective cameras 108 of the platform 104, a sequence of images 110 may be captured at various times 214. Using image processing and machine vision techniques, it may be possible to extrapolate from the images 110 the travel of the platform 104 over time. For example, for a particular pair of adjacent images 110 in the sequence, one or more tie points may be identified (e.g., fixed points in the area 102 that are visible in a first position of the first image 110 captured at a first time 214, and in a second position of the second image 110 captured at a second time 214). Comparing the offset of the tie point from the first image 110 to the second image 110 may enable a determination 302 of the translation and/or orientation change of the platform 104 between the first time 214 and the second time 214. A collective evaluation of all of the images 110 may enable a mapping such determinations 302 to locations 114 in the area 102, and the identification of a camera path 304 of the camera 108 traveling throughout the area 102 while mounted on the platform 104.

As a second example, a laser scanner 202 may periodically scan the area 102 while the platform 104 travels therethrough, and may capture lidar data 212 at various times 214. The identification of lidar point clouds 216 in respective sets of lidar data 212 may enable the determination of the sizes, shapes, orientations, and distances of objects 116 from the laser scanner 202 at the time 214. Additionally, a comparison of a first lidar point cloud 216 in a first set of lidar data 212 captured at a first time 214 and a second lidar point cloud 216 in a second set of lidar data 212 captured at a second time 214 may enable a determination of the translation and/or orientation change of the laser scanner 202 between the first time 214 and the second time 214. Performing such comparative evaluation of sets of lidar data 212 across the sequence of captured laser scans may enable the determination 306 of the locations and orientations of the laser scanner 202 over time 214, and the identification of a laser scanner path 308 indicating the movement of the laser scanner 202 over time 214 while the platform 104 travels through the area 102.

As a third example, monitoring the locations 114 detected by a location sensor 112 of the platform 104 at a variety of times 214 may enable the detection of a sequence of locations 114 of the platform 104 while traveling through the area 102, and which may be represented as a location sensor path 310.

In view of these different techniques of detecting a sensor path of the sensor mounted on the platform 104 while traveling through the area 102, it may be possible to perform a comparison 312 of the sensor paths. If the comparison 312 indicates a match among the camera paths 304 of the at least one camera 108, the laser scanner paths 308 of the at least one laser scanner 202, and the location sensor path 310 of the location sensor 112, the comparison 312 may verify the calibration 314 of the sensors of the platform 104. However, if one or more of the comparisons 312 fails to produce a match, a miscalibration may be detected. It may also be possible to determine which sensor is miscalibrated (e.g., if all of the sensor paths match except for one camera path 304 of one camera 108 that does not match any of the other sensor paths, the camera 108 may be presumed to be miscalibrated). The platform 104 may then either be serviced to recalibrate or replace the miscalibrated sensor; may continue traveling through the area 102 while capturing data from all but the miscalibrated sensor(s); and/or may continue capturing data about the area 102 from all of the sensors, but noting the divergence in calibration in order to adjust the data captured by that sensor. In this manner, the platform 104 may verify maintained calibration 314 and/or detect and adapt to miscalibration while the platform 104 is traveling through an area 102 in accordance with the techniques presented herein.

C. Exemplary Embodiments

Figure 4:
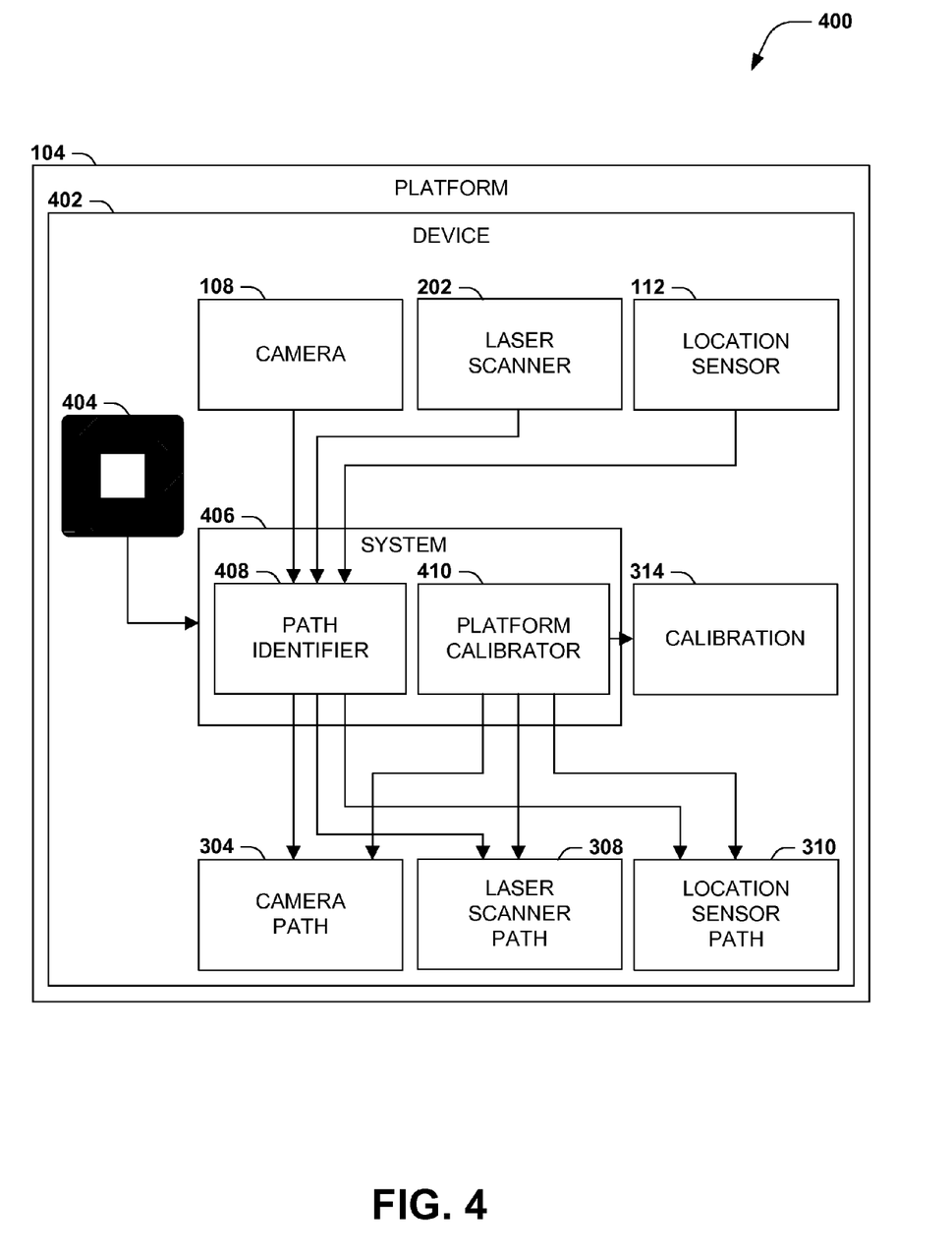
FIG. 4 is a component block diagram of an exemplary system configured to verify a calibration of the sensors of a mobile platform in accordance with the techniques presented herein.
Figure 5:
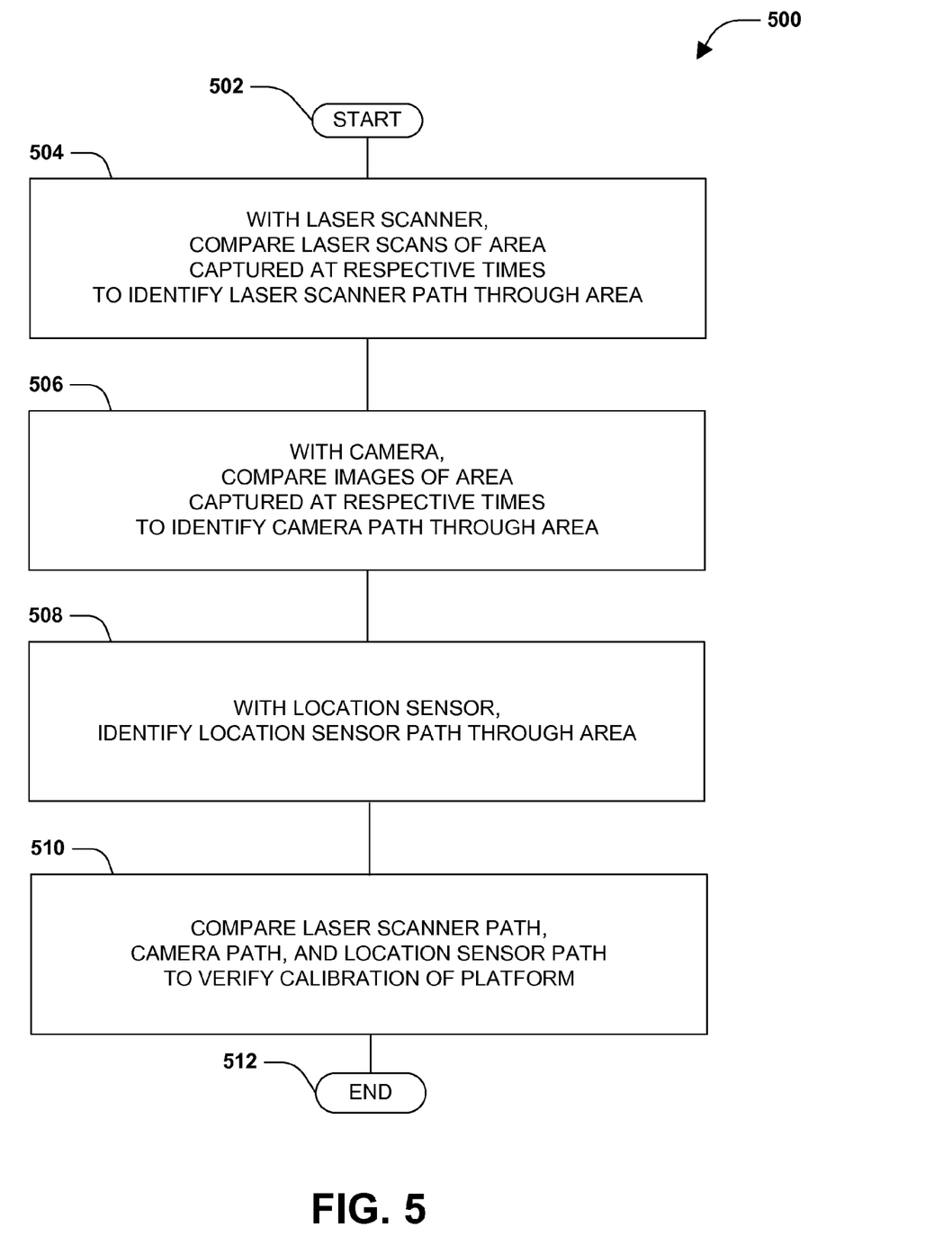
FIG. 5 is a flow diagram of an exemplary method of verifying a calibration of the sensors of a mobile platform in accordance with the techniques presented herein.

FIG. 4 presents an illustration of an exemplary scenario 400 featuring a first exemplary embodiment of the techniques presented herein, illustrated as an exemplary system 406 configured to verify a calibration 314 of a set of sensors of a platform 104, where the sensors include at least one camera 108, at least one laser scanner 202, and at least one location sensor 112. The exemplary system 406 may be implemented, e.g., as instructions stored in a memory component of a device 402 of the platform 104 and that are configured to, when executed on the processor 404 of the device 402 of the platform 104, cause the device 402 to operate according to the techniques presented herein. The exemplary system 406 includes a path identifier 408 that, with the respective laser scanners 202, compares laser scans of the area 102 captured at respective times 214 to identify a laser scanner path 220 through the area 102; with the respective cameras 108, compares the images 110 of the area 102 captured by the camera 108 at respective times 214 to identify a camera path 304 through the area 102; and, with the location sensor 112, identifies a location sensor path 310 through the area 102. The exemplary system also comprises a platform calibrator 410, which compares the laser scanner path(s) 308, the camera path(s) 304, and the location sensor path(s) 310 to verify the calibration 314 of the platform 104. In this manner, the exemplary system 406 enables the verification of maintained calibration 314 and the detection of miscalibration while the platform 104 travels through the area 102 in accordance with the techniques presented herein. FIG. 5 presents a second exemplary embodiment of the techniques presented herein, illustrated as an exemplary method 500 of verifying a calibration 314 of a platform 104 traveling through an area 102 while capturing a representation of the area 102 using at least one camera 108, at least one laser scanner 202, and at least one location sensor 112. The exemplary method 500 may be implemented, e.g., as a set of instructions stored in a memory device of a device 402, such as a memory circuit, a platter of a hard disk drive, a solid-state storage device, or a magnetic or optical disc, and organized such that, when executed on a processor 404 of the device 402, cause the device 402 to operate according to the techniques presented herein. The exemplary method 500 begins at 502 and involves, with the respective laser scanners 202, comparing 504 laser scans of the area 102 captured at respective times 214 to identify a laser scanner path 308 through the area 102. The exemplary method 500 also involves, with the respective cameras 108, comparing 506 images 110 of the area 102 captured at respective times 214 to identify a camera path 304 through the area 102. The exemplary method 500 also involves, with the respective location sensors 112, identifying 508 a location sensor path 310 through the area 102. The exemplary method 500 also involves comparing 510 the laser scanner path(s) 308, the camera path(s) 304, and the location sensor path(s) 310 to verify a calibration 314 of the platform 104, and/or to detect a miscalibration of at least one sensor, while the platform 104 travels through the area 102 in accordance with the techniques presented herein, and so ends at 512.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
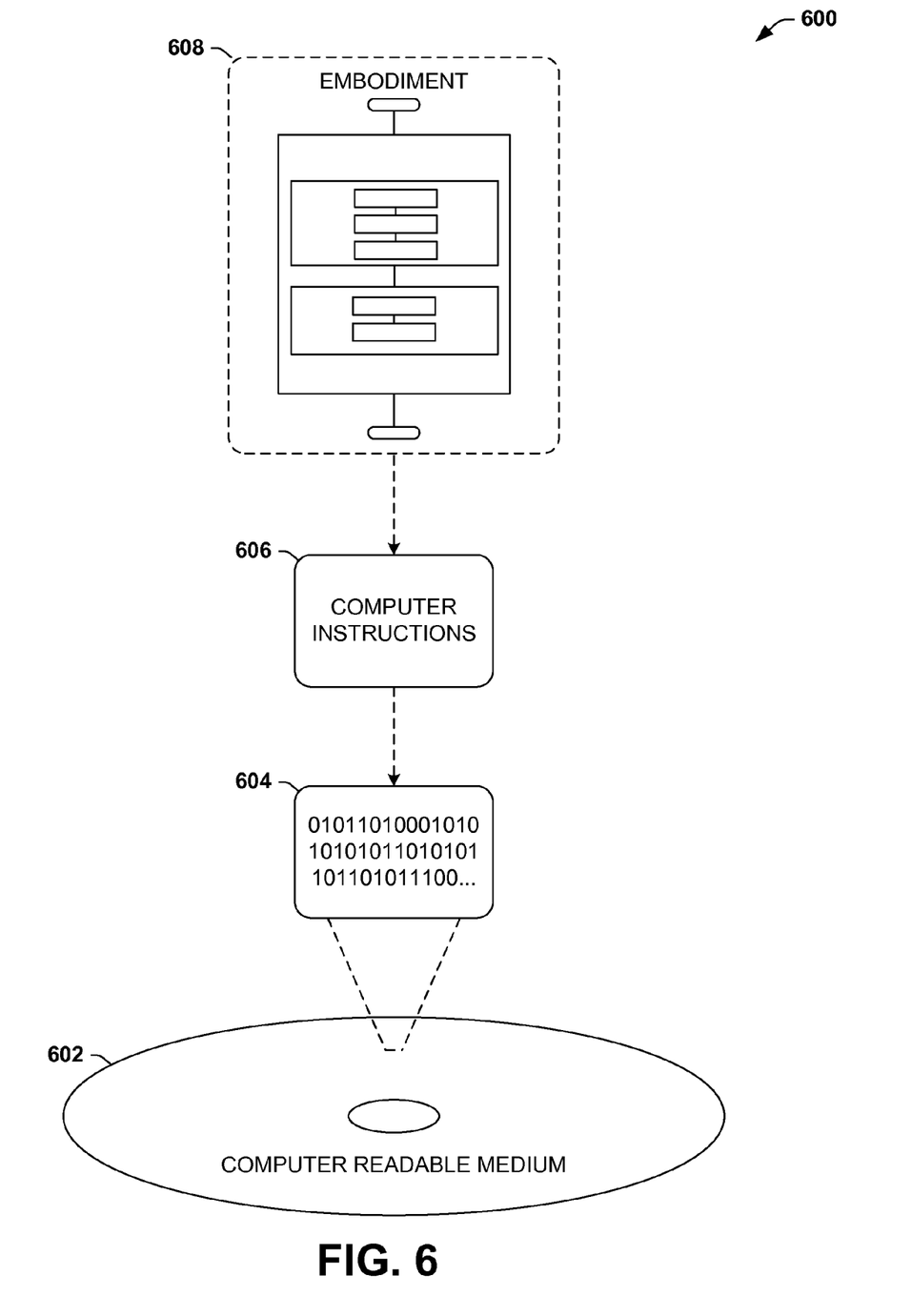
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to implement a system for verifying the calibration 314 of the sensors of a platform 104 traveling through an area 102, such as the exemplary system 406 of FIG. 4. In another such embodiment, the processor-executable instructions 606 may be configured to perform a method 608 of verifying a calibration 314 of the sensors of a platform 104, such as the exemplary method 500 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 406 of FIG. 4, and the exemplary method 500 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of platforms 104, including vehicles traveling in the area 102, such as automobiles and bicycles traveling on a roadway or airplanes, helicopters and unmanned aerial vehicles (UAVs) traveling in an airspace; individuals moving in an area, such as a motion-capture area 102; and projectiles moving in a space, such as ballistics. Such platforms 104 may also be operated in whole or in part by humans present in or near the platform 104 or remotely monitoring the platform 104, and in whole or in part by automated navigation techniques.

As a second variation of this first aspect, the techniques presented herein may be utilized with many types of cameras 108, including monochromatic and polychromatic visible light cameras, infrared cameras, and ultraviolet cameras. Such cameras may also include a variety of lenses, such as orthogonal, fisheye, spherical, and polarized lenses; imagers, such as digital imagers recording to removal media or fixed internal storage, film-based cameras, and videocameras; various shutter and exposure speeds, including high-speed cameras, time-lapse cameras, and extended-exposure cameras for low-light imaging; and focusing and imaging techniques, such as tilt-shift and high dynamic range.

As a third variation of this first aspect, the techniques presented herein may be utilized with many types of laser scanning techniques, such as visible, near-infrared, or infrared, near-ultraviolet, or ultraviolet light. Various wavelengths of lidar signals may present various properties that may be advantageous in different scenarios, such as passage through various media (e.g., water or air of varying humidity), sensitivity to various forms of interference, and achievable resolution. Additionally, such laser scanning techniques may involve various types of lidar emitters 204 and/or lidar detectors 210, such as various types of lasers and photometric detectors. Such equipment may also be utilized in the performance of other techniques (e.g., lidar equipment provided for range detection in vehicle navigation systems may also be suitable for the classification of moving and stationary objects), and may be applied to both sets of techniques concurrently or in sequence.

As a fourth variation of this first aspect, the techniques presented herein may be utilized with many types of location sensors 112, including global positioning system (GPS) receivers; inertial measurement units (IMUs); radio triangulation devices; and compasses.

As a fifth variation of this first aspect, the techniques presented herein may be utilized with platforms 104 deployed to capture data for many types of representations, such as navigable panoramic tours of the area 102; three-dimensional reconstruction of objects 116 comprising the area 102; identification of objects 116 located in the area 102, such as people, vehicles, flora, and fauna; monitoring of the electromagnetic spectrum; and the generation of maps of the area 102. Those of ordinary skill in the art may devise many such scenarios wherein the techniques presented herein may be advantageously utilized.

D2. Sensor Path Comparison

A second aspect of the techniques presented herein relates to the manner of comparing the sensor paths generated by the techniques.

As a first variation of this second aspect, before the sensor paths are captured, the sensors and platform 104 may be calibrated in a controlled setting. As one such example, calibration may be achieved by positioning the platform 104 relative to a fixed position of at least one target in a fixed area comparing a first detected position of the target by at least one laser scanner 202 with the fixed position of the target relative to the platform 104; and comparing a second detected position of the target by the camera 108 with the fixed position of the target relative to the platform 104. The comparisons of the sensor paths may then be performed in view of the calibration of the laser scanner(s) 202, the camera(s) 108, and the location sensor(s) 112 with the platform 104.

As a second variation of this second aspect, the comparison of sensor paths to verify the calibration 316 may be performed at various times with respect to the capturing of the area 102 by the platform 104. As a first such example, the comparing and verification of calibration 316 may be performed while the platform 104 is traveling through the area 102. As a second such example, the comparing and verification of calibration 316 may be performed after the capturing of the area 102 by the platform 104 (i.e., in post-processing the captured representation of the area 102). For example, the platform 104 may be configured to, upon capturing a laser scan of the area 102, store the laser scan; upon capturing an image 110 of the area 102, store the image 110; and upon detecting a location 114 of the platform 104, store the location 114 of the platform 104. The comparing may then be performed after the platform 104 has traveled through the area 102, by retrieving stored laser scans, images 110, and locations 114, and comparing the laser scanner path 308 and the camera path 304 with the location sensor path 310 to verify the calibration 316 of the platform 104 while the platform 104 was traveling through the area 102.

As a third variation of this second aspect, the comparison to verify the calibration 316 of the sensors may be performed in a three-way manner, e.g., by comparing the laser scanner path 308 of at least one scanner 202 with the camera path 304 of at least one camera 108; by comparing the laser scanner path with the location sensor path 310 of at least one location sensor 112; and by comparing the camera path 304 with the location sensor path 310. Additionally, if multiple sensors of a particular sensor type are included in the platform 104, comparisons may be made among multiple sensors of the same type (e.g., comparing a first camera path 304 of a first camera 108 with a second camera path 304 of a second camera 108).

As a fourth variation of this second aspect, the comparison to verify the calibration 316 of the sensors may involve a registration of the respective sensor paths with a platform-independent coordinate system. For example, a comparison between a first path of a first sensor and a second path of a second sensor may be achieved by registering the first path with a platform-independent coordinate system to produce a registered first path; registering the second path with the platform-independent coordinate system to produce a registered second path; and comparing the registered first path and the registered second path. In an embodiment, the platform-independent coordinate system may comprise a static coordinate system (e.g., the ground of the area 102).

As a fifth variation of this second aspect, the comparison to verify the calibration 316 may be performed among captured representations of the area 102 by different sensors at the same time 214. For example, a location sensor 112 may be configured to perform a detection of a location 114 of the platform 104 at a location detection frequency (e.g., once per second). One or more laser scanners 202 may be configured to capture laser scans of the area 102 in a manner that is synchronized with the time 214 of the detection of the location 114 of the platform 104 by the location sensor 112; and/or one or more cameras 108 may be configured to capture images 110 of the area 102 in a manner that is synchronized with the time 214 of the detection of the location 114 of the platform 104 by the location sensor 112. Alternatively, the laser scanner 202 and/or camera 108 may capture representations of the area 102 more frequently than the location sensor 112, but may be timed to include a capturing at the same time 214 as the location sensor 112 (e.g., at a frequency that is a multiple of the frequency of the location sensor 112).

As a sixth variation of this second aspect, the device 402 may be configured to detect and compensate for missing data objects that were not captured by one or more sensors. For example, upon detecting a missing data object that a sensor failed to capture at a selected time 214 (e.g., a missing laser scan captured by the laser scanner 202, a missing image 110 captured by the camera 108, and/or a missing location 114 detected by the location sensor 112), the device 402 may interpolate the missing data object at the selected time 214 using various interpolation techniques (e.g., a quaternion interpolation).

Figure 7:
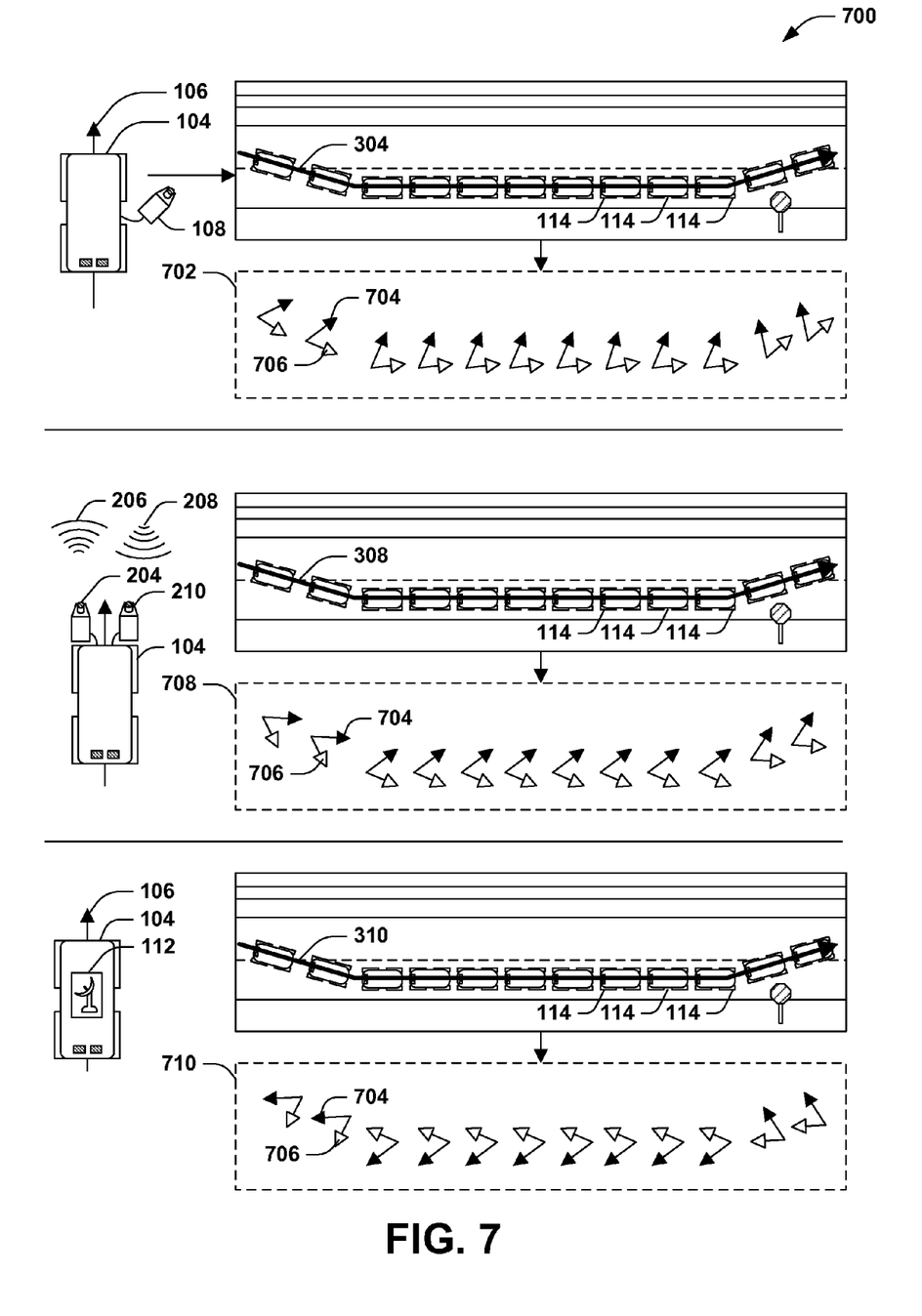
FIG. 7 is an illustration of an exemplary scenario featuring a determination of a translation and orientation for respective sensor paths of a mobile platform in accordance with the techniques presented herein.

FIG. 7 presents an exemplary scenario 700 featuring a first such variation of the techniques presented herein, wherein respective sensor paths are captured as a sequence of vectors. In this exemplary scenario 700, as a platform 104 travels through an area 102, a camera path 304 is detected for a camera 108; a laser scanner path 308 is detected for a laser scanner 202; and a location sensor path 310 is detected for a location sensor 112. Additionally, the respective sensor paths are captured and represented as a sequence of vectors identifying, at respective locations 114, an orientation 704 and a translation 706 of the sensor over time 214. As a first such example, the camera path 304 is translated into a vector-based camera path 702 indicating, for each location 114 where an image 110 of the area 102 has been captured, the direction and magnitude of translation 706 and the orientation 704 of the location 114 with respect to a preceding and/or subsequent image 110 and/or location 114. As a second such example, the laser scanner path 308 is translated into a vector-based laser scanner path 708 indicating, for each location 114 where a laser scan of the area 102 has been captured, the direction and magnitude of translation 706 and the orientation 704 of the location 14 with respect to a preceding and/or subsequent laser scan and/or location 114. As a third such example, the location sensor path 310 is translated into a vector-based location sensor path 710 indicating, for each location 114 where a location 114 of the platform 104 has been detected, the direction and magnitude of translation 706 and the orientation 704 of the location 114 with respect to a preceding and/or subsequent location 114 where the position of the platform 104 has been detected. By representing the sensor paths in a vector-based manner, an embodiment may facilitate the comparison of the sensor paths to verify the calibration 316 thereof.

Figure 8:
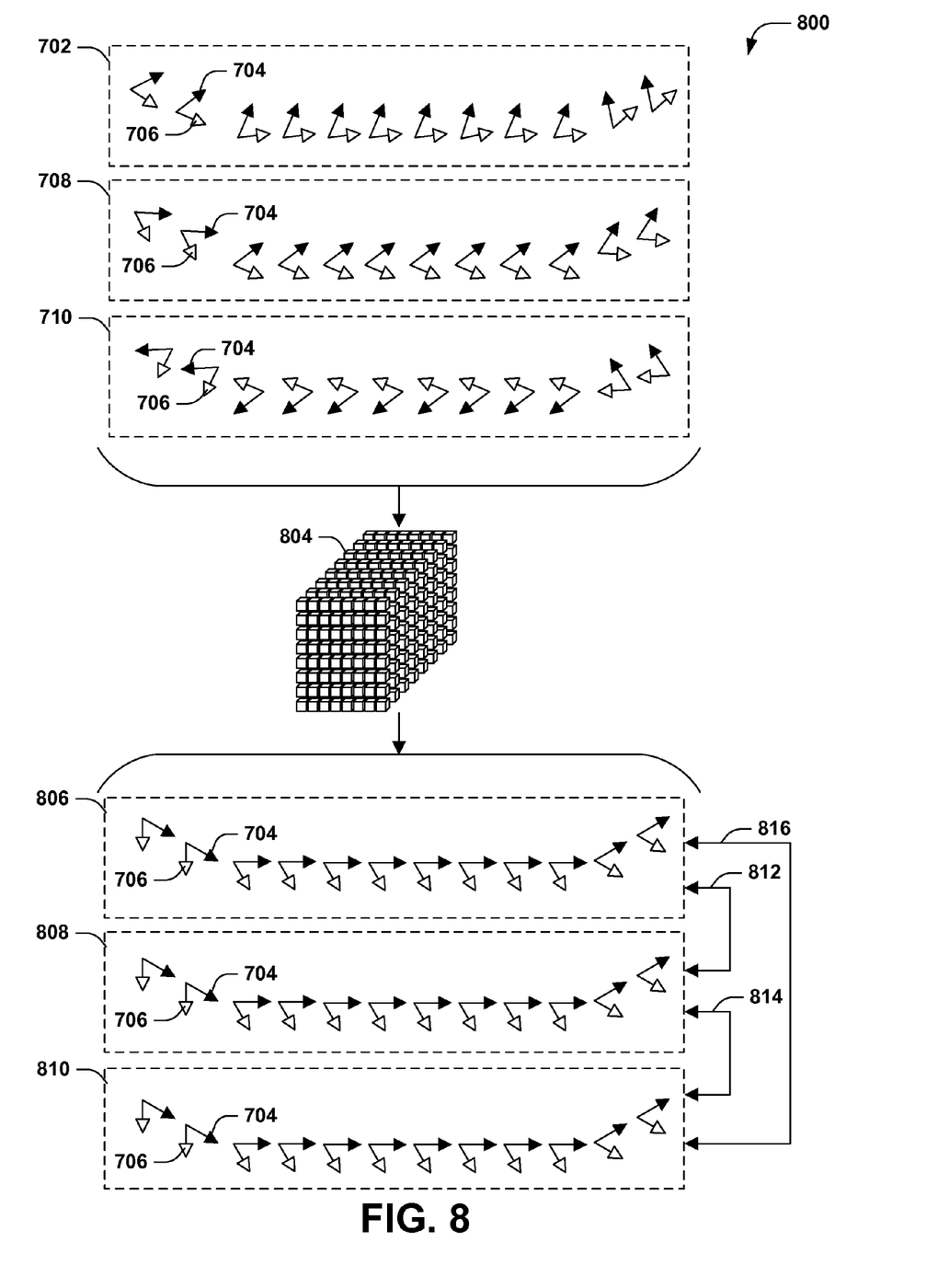
FIG. 8 is an illustration of an exemplary scenario featuring a registration of respective sensor paths of a mobile platform with an independent coordinate system in order to facilitate a comparison of the sensor paths in accordance with the techniques presented herein.

FIG. 8 presents an illustration of an exemplary scenario 800 wherein such sensor paths are further registered from a vector-based path in the coordinate system of the sensor (e.g., detected relative to the orientation of the sensor mounted on the platform 104) to a static coordinate system 804 (e.g., corresponding to the ground of the area 102). In this exemplary scenario 800, each of the vector-based camera path 702, the vector-based laser scanner path 708, and the vector-based location sensor path 710 is registered with the static coordinate system 804 to produce, respectively, a registered camera path 806, a registered laser scanner path 808, and a registered location sensor path 810, thus removing differences in the orientation of each sensor with respect to the platform 104 from the comparison. A three-way comparison may then be performed, comprising a first comparison 812 of the registered camera path 806 and the registered laser scanner path 808; a second comparison 814 of the registered laser scanner path 808 and the registered location sensor path 810; and a third comparison 816 of the registered camera path 806 and the registered location sensor path 810. Those of ordinary skill in the art may devise many such variations in the comparisons of the sensor paths for inclusion in various embodiments of the techniques presented herein.

D3. Laser Scanner Path Generation

A third aspect that may vary among embodiments of the techniques presented herein relates to the manner of generating the laser scanner path 308 of a laser scanner 202.

As a first variation of this third example, the laser scanner 202 may comprise a lidar scanner configured to generate the laser scan as a lidar point cloud 216. The identification of the laser scanner path 304 may then be achieved by comparing a first lidar point cloud 216 captured at a first time 214 and a second lidar point cloud 216 captured at a second time 214 to identify a movement of the lidar scanner between the first time 214 and the second time 214. In an embodiment, the movement evaluation is performed as an iterative closest point evaluation of the first lidar point cloud 216 and the second lidar point cloud 216. Additionally, the evaluation of the first lidar point cloud 216 may involve identifying a first orientation of the laser scanner 202 at the first time 214; the evaluation of the second lidar point cloud 216 may involve identifying a second orientation of the laser scanner 202 at the second time 214; and identifying the movement may involve comparing the first orientation and the second orientation of the laser scanner 202 to identify a rotation and a translation of the laser scanner 202 between the first time 214 and the second time 214.

As a second variation of this third example, an embodiment may be configured to identify the location sensor path 310 of the location sensor 112 by identifying, between the first time 214 and the second time 214, a rotation and a translation of the location sensor 112, and to compare the rotation and the translation of the laser scanner 202 between the first time 214 and the second time 214 with the rotation and the translation of the location sensor path 310 between the first time 214 and the second time 214. Additionally, the comparison of the first lidar point cloud 216 and the second lidar point cloud 216 may involve recomparing the first lidar point cloud 216 and the second lidar point cloud 216 in view of the comparison of the laser scanner path 308 and the location sensor path 310. In some such embodiments, an iterative approach may be utilized to compare the lidar point clouds 216 and the synchrony with the locations 114 detected by the location sensor 112 until achieving a convergence. These and other techniques may be utilized to identify the laser scanner path 308 in accordance with the techniques presented herein.

D4. Camera Path Generation

A fourth aspect that may vary among embodiments of the techniques presented herein relates to the manner of identifying the camera path 304 of a camera 108 attached to the platform 104 while traveling through the area 102.

As a first variation of this fourth aspect, the comparison of images 110 may involve many image processing and/or machine vision techniques, using such estimation techniques as perspective, parallax, and scale. One such technique involves identifying a tie point that is visible in a first image 110 captured at a first time 214, and also in a second image 110 captured at a second time 214, and comparing a first position of the tie point in the first image 110 with a second position of the tie point in the second image 110 to identify the movement of the camera 108 between the first time 214 and the second time 214. Another such technique involves, from the images 110, generating a reconstruction of the area 102 (e.g., a three-dimensional model), and, for respective images 110 captured at a time 214, identifying the position of the camera 108 within the reconstruction at the time 214 (e.g., the point of perspective, projection, or vantage within the three-dimensional model where a captured image 110 matches the perspective of the actual image 110). In an embodiment, a photogrammetric bundle adjustment technique is applied to refine the coordinate space of the reconstruction to orient the images 110 therewithin, thus enabling the generation of an accurate camera path 304 for comparison with the sensor paths of the other sensors to verify the calibration 316 of the platform 104. Those of ordinary skill in the art may devise many such techniques for generating the camera path 304 in accordance with the techniques presented herein.

E. Computing Area

Figure 9:
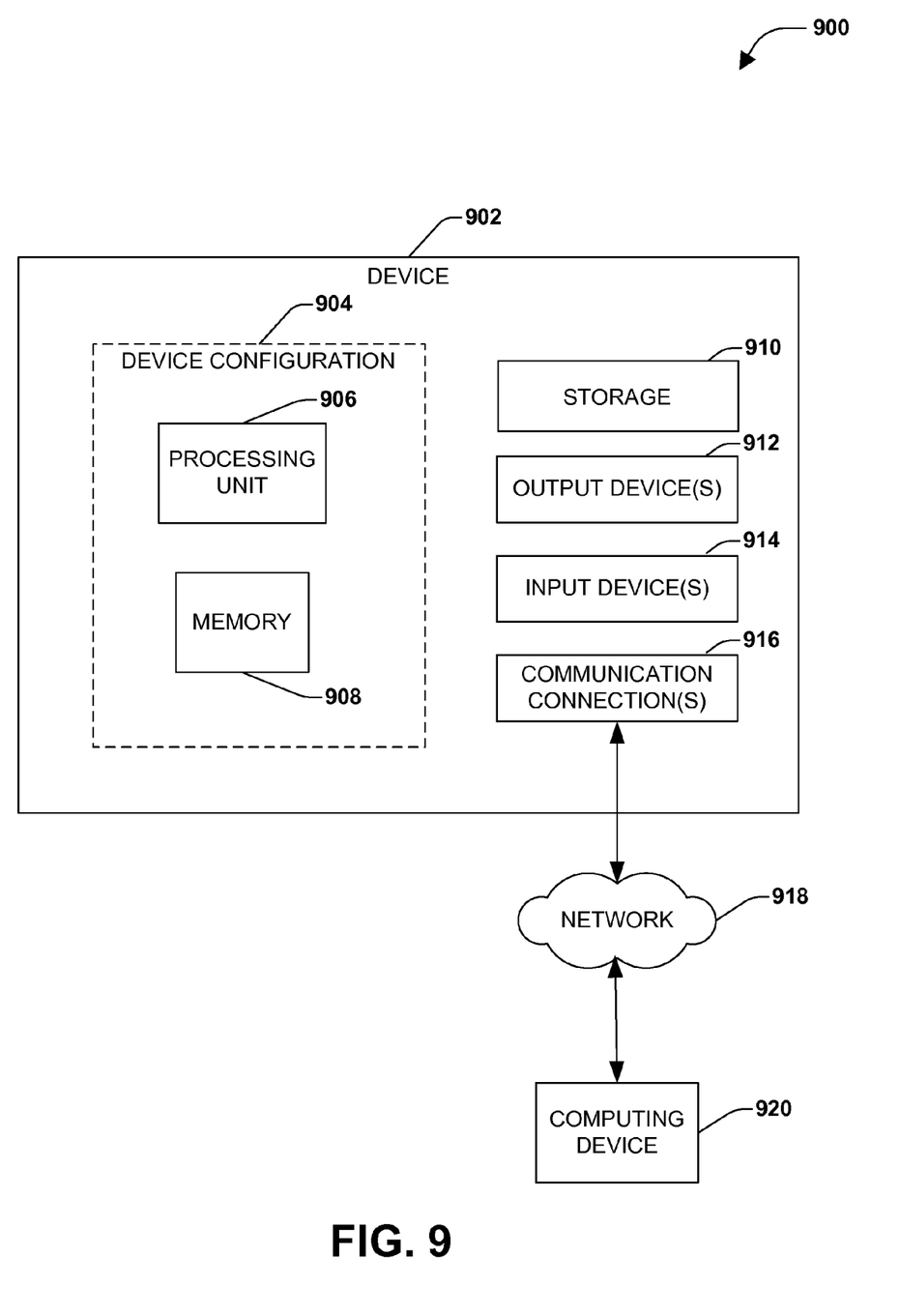
FIG. 9 illustrates an exemplary computing area wherein one or more of the provisions set forth herein may be implemented.

FIG. 9 and the following discussion provide a brief, general description of a suitable computing area to implement embodiments of one or more of the provisions set forth herein. The operating area of FIG. 9 is only one example of a suitable operating area and is not intended to suggest any limitation as to the scope of use or functionality of the operating area. Example computing devices include, but are not limited to, personal computers, server computers, handheld or laptop devices, mobile devices (such as mobile phones, Personal Digital Assistants (PDAs), media players, and the like), multiprocessor systems, consumer electronics, mini computers, mainframe computers, distributed computing areas that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various areas.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for calibrating at least one sensor of a platform traveling through an area and comprising a camera, a laser scanner, and a location sensor, the system comprising:
    a path identifier that:
    with the laser scanner, compares laser scans of the area captured at respective times to identify a laser scanner path through the area;
    with the camera, compares images of the area captured at respective times to identify a camera path through the area; and
    with the location sensor, identifies a location sensor path through the area; and
    a platform calibrator that compares the laser scanner path, the camera path, and the location sensor path to verify a calibration of the at least one sensor of the platform.

2. A computer-readable storage device comprising instructions that, when executed on a processor of a platform traveling through an area and comprising a camera, a laser scanner, and a location sensor, calibrate at least one sensor of the platform by:
    with the laser scanner, comparing laser scans of the area captured at respective times to identify a laser scanner path through the area;
    with the camera, comparing images of the area captured at respective times to identify a camera path through the area;
    with the location sensor, identifying a location sensor path through the area; and
    comparing the laser scanner path, the camera path, and the location sensor path to verify a calibration of the at least one sensor of the platform.

3. A method of calibrating at least one sensor of a platform traveling through an area and comprising a camera, a laser scanner, and a location sensor, the method comprising:
    with the laser scanner, comparing laser scans of the area captured at respective times to identify a laser scanner path through the area;
    with the camera, comparing images of the area captured at respective times to identify a camera path through the area;
    with the location sensor, identifying a location sensor path through the area; and
    comparing the laser scanner path, the camera path, and the location sensor path to verify a calibration of the at least one sensor of the platform.

4. The method of claim 3, wherein:
    the method further comprises: calibrating the laser scanner, the camera, and the location sensor with the platform; and
    comparing the laser scanner path and the camera path with the location sensor path further comprises: comparing the laser scanner path and the camera path with the location sensor path in view of the calibration of the laser scanner, the camera, and the location sensor with the platform.

5. The method of claim 4, wherein calibrating the laser scanner and the camera further comprises:
    positioning the platform relative to a fixed position of at least one target in a fixed area;
    comparing a first detected position of the target by the laser scanner with the fixed position of the target relative to the platform; and
    comparing a second detected position of the target by the camera with the fixed position of the target relative to the platform.

6. The method of claim 3, wherein the comparing further comprises: comparing the laser scanner path and the camera path with the location sensor path to verify the calibration of the platform while the platform is traveling through the area.

7. The method of claim 3, wherein:
    the method further comprises:
        upon capturing a laser scan of the area, storing the laser scan;
        upon capturing an image of the area, storing the image; and
        upon detecting a location of the platform, storing the location of the platform; and
    the comparing further comprises: after the platform has traveled through the area:
        retrieving stored laser scans, images, and locations; and
        comparing the laser scanner path and the camera path with the location sensor path to verify the calibration of the platform while the platform was traveling through the area.

8. The method of claim 3, wherein verifying the calibration of the platform further comprises:
    comparing the laser scanner path with the camera path;
    comparing the laser scanner path with the location sensor path; and
    comparing the camera path with the location sensor path.

9. The method of claim 8, wherein respective comparisons between a first path and a second path further comprise:
    registering the first path with a platform-independent coordinate system to produce a registered first path;
    registering the second path with the platform-independent coordinate system to produce a registered second path; and comparing the registered first path and the registered second path.

10. The method of claim 9, wherein the platform-independent coordinate system comprises a static coordinate system.

11. The method of claim 3, wherein:
the location sensor is configured to perform a detection of a location of the platform at a location detection frequency;
capturing the laser scans of the area further comprises: synchronizing the capturing of the laser scans with the detection of the location of the platform by the location sensor; and
capturing the images of the area further comprises: synchronizing the capturing of the images with the detection of the location of the platform by the location sensor.

12. The method of claim 3, wherein the method further comprises:
upon detecting a missing data object from the capturing at a selected time, the missing data object selected from a missing data object set comprising:
a missing laser scan captured by the laser scanner,
a missing image captured by the camera, and
a missing location detected by the location sensor,
interpolating the missing data object at the selected time according to a quaternion interpolation.

13. The method of claim 3, wherein:
the laser scanner comprises a lidar scanner;
the laser scan comprises a lidar point cloud; and
identifying the laser scanner path further comprises: comparing a first lidar point cloud captured at a first time and a second lidar point cloud captured at a second time to identify a movement of the laser scanner between the first time and the second time.

14. The method of claim 13, wherein identifying the movement further comprises: performing an iterative closest point evaluation of the first lidar point cloud and the second lidar point cloud to identify the movement of the laser scanner.

15. The method of claim 13, wherein:
the method further comprises:
evaluating the first lidar point cloud to identify a first orientation of the laser scanner at the first time, and evaluating the second lidar point cloud to identify a second orientation of the laser scanner at the second time; and
identifying the movement further comprises: comparing the first orientation and the second orientation of the laser scanner to identify a rotation and a translation of the laser scanner between the first time and the second time.

16. The method of claim 15, wherein:
identifying the location sensor path further comprises: with the location sensor, identifying, between the first time and the second time, a rotation and a translation; and
comparing the laser scanner path and the location sensor path further comprises: comparing the rotation and the translation of the laser scanner between the first time and the second time with the rotation and the translation of the location sensor path between the first time and the second time.

17. The method of claim 13, wherein comparing the first lidar point cloud and the second lidar point cloud further comprises: recomparing the first lidar point cloud and the second lidar point cloud in view of a comparison of the laser scanner path and the location sensor path.

18. The method of claim 3, wherein comparing the images to identify the camera path further comprises:
identifying a tie point visible in a first image captured at a first time and a second image captured at a second time; and
comparing a first position of the tie point in the first image and a second position of the tie point in the second image to identify the movement of the camera between the first time and the second time.

19. The method of claim 3, wherein identifying the camera path through the area further comprises:
from the images, generate a reconstruction of the area; and
for respective images captured at a time, identify the position of the camera within the reconstruction at the time.

20. The method of claim 19, wherein the instructions are further configured to perform a photogrammetric bundle adjustment of the reconstruction of the area.

* * * * *